March 11, 1947. W. A. WARD 2,417,145
APPARATUS FOR HANDLING AND SEPARATING SHEET-LIKE MATERIAL
Filed Aug. 3, 1944 2 Sheets-Sheet 1

INVENTOR
William Arthur Ward

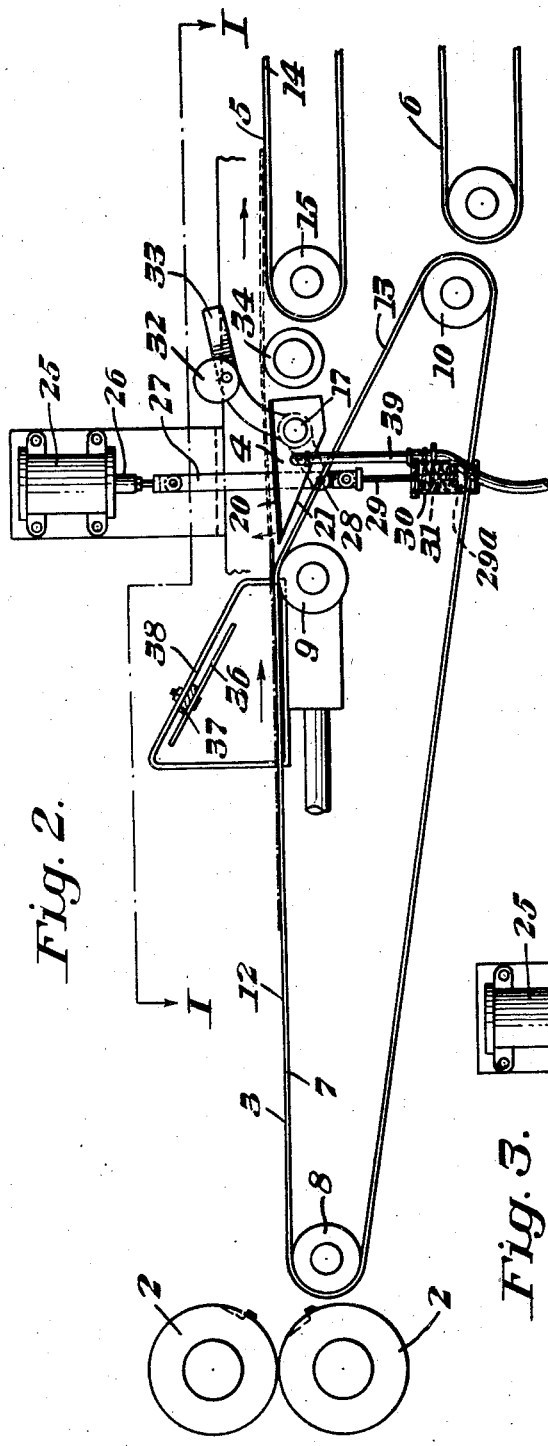
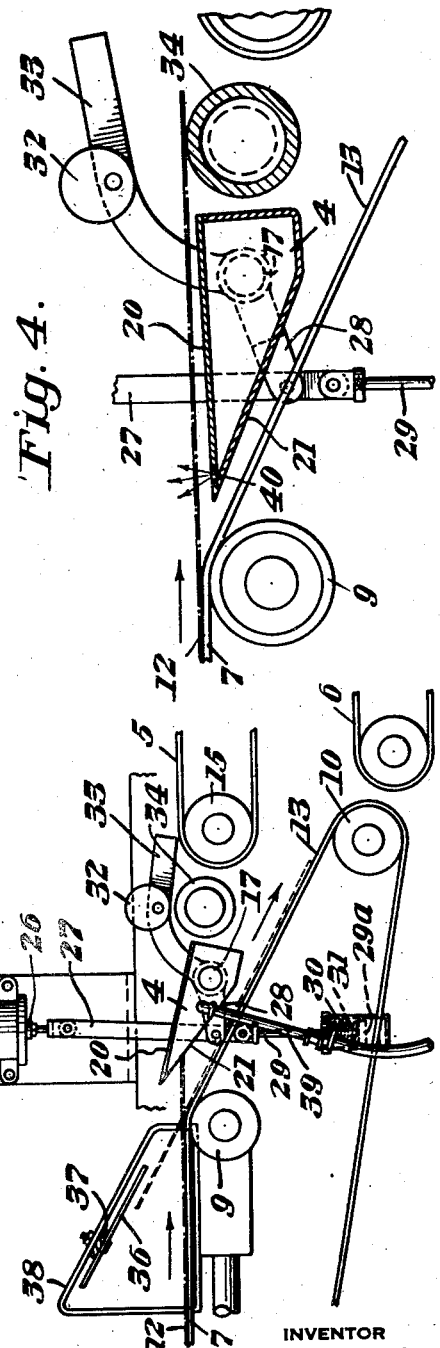
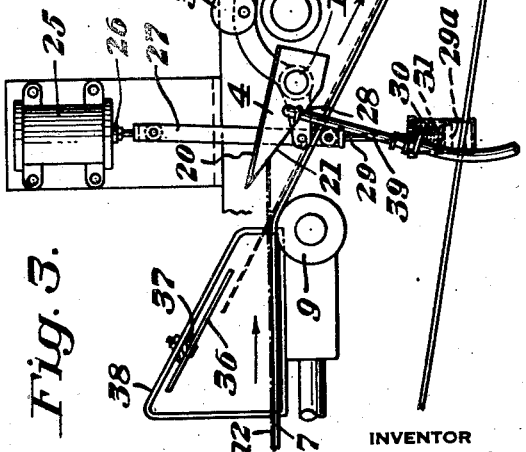

Patented Mar. 11, 1947

2,417,145

UNITED STATES PATENT OFFICE 2,417,145

APPARATUS FOR HANDLING AND SEPARATING SHEETLIKE MATERIAL

William Arthur Ward, New Cumberland, W. Va., assignor to National Steel Corporation, a corporation of Delaware Application August 3, 1944, Serial No. 547,962

10 Claims. (Cl. 198—81)

The present invention relates to apparatus for handling and separating sheet-like material, and, more particularly, to apparatus for automatically separating defective metal sheets from non-defective sheets. My invention is particularly useful in a shearing line where strip-like material in long lengths is sheared into short lengths or sheets and where it is desired to segregate defective sheets from the commercially acceptable sheets or where it is desirable to segregate the material into several grades. The apparatus which I provide is particularly suitable for use in the shearing line employed in the manufacture of electro-coated tin plate. While my invention is described herein as applied to such a shearing line, it is not limited thereto, but may be employed wherever it is desired to automatically separate the defective sheet-like material from the non-defective material.

In the manufacture of tin plate by the electro-tinning process, the strip is cleaned, treated, coated with the layer of tin, further processed and then sheared to suitable lengths. The sheets are then passed along a conveyor and stacked in suitable piles at the end of the conveying mechanism. Some of the sheets may not meet the requirements as to gauge or may contain other defects, and hence must be separated from the non-defective sheets. This is ordinarily accomplished by interposing in the conveying mechanism a gate structure which will be automatically raised or lowered at a suitable time to deflect the defective sheets from the normal path of travel along the conveyor. The defective sheets in this way are separated from the suitable sheets which continue along the conveying mechanism to the stacking point.

One of the deficiencies of apparatus of this character has been that excessive wear on the gate is caused by the sheets as they pass over the gate in their normal travel. Also the gate has a marked tendency to deface the sheets and render them unsuitable for use as prime sheets. This is especially true where the gate has become worn to some extent by the passage of sheets thereover. The wear on the gate is normally irregular and defacement of the sheets results unless the gate is replaced at suitable time intervals.

In accordance with the present invention I provide an apparatus which is of such character that it will prevent or greatly minimize wear on the gate and defacement of the material by the gate. In accordance with my invention I provide means for blowing a fluid, preferably gas, against one face of the sheet-like material as it passes over the gate when the gate is in normal or non-deflecting position. The fluid provides a cushioning effect between the sheet and the gate and at least partially supports the sheet. Sufficient fluid can be forced against the sheet to cause it to float over the area occupied by the gate so that there is no contact whatever between the gate and the sheet, but ordinarily it is merely necessary to force an amount of fluid against the sheet sufficient to cushion the sheet so that, while contact occurs between the gate and the sheet, this contact is insufficient to cause excessive wear on the gate or to permit the gate to deface the material.

In the accompanying drawings I have shown for purposes of illustration only a preferred embodiment of my invention. In the drawings Figure 1 is a partial plan, partial sectional view along the line I—I of Figure 2 of apparatus embodying my invention;

Figure 2 is a side elevational view, partly diagrammatic, of apparatus embodying my invention;

Figure 3 is a side elevational view, partly diagrammatic, of a part of the apparatus shown in Figure 2, the gate being shown in material-deflecting position; and Figure 4 is a view partly in section and partly in elevation of the gate structure shown in Figure 2.

Figure 1:
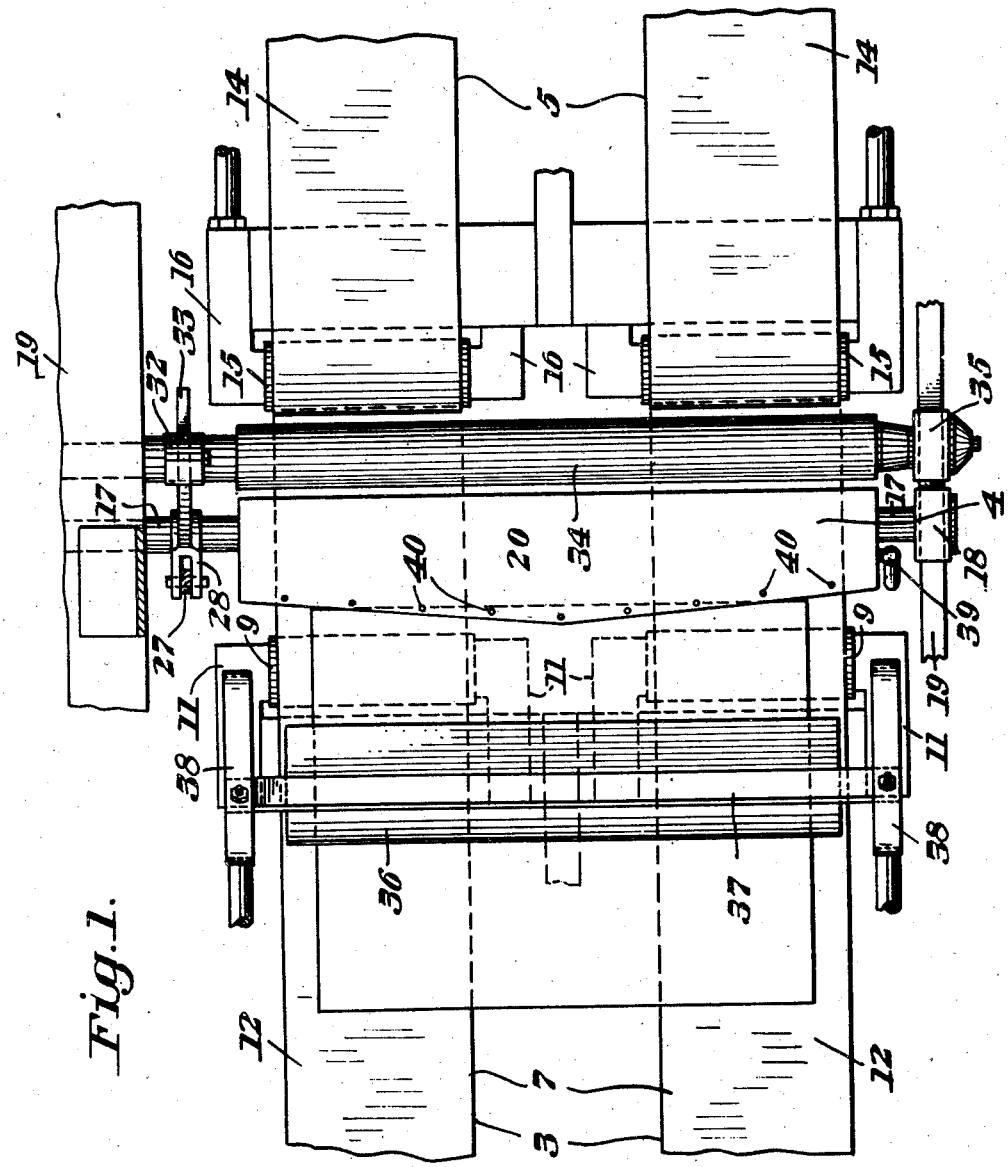

As is shown in Figure 2, the material in strip form passes in between the rolls 2 of a rotary shear where the material is sheared into sheet form. The separate sheets are then carried by the conveyor 3, in the direction of the arrows in Figures 2, 3 and 4, over a gate indicated generally by the reference character 4 and onto a second conveyor 5. In the event that any of the sheets are defective, the gate 4 is raised to a deflecting position in the manner described hereinafter and the sheets, instead of passing over the gate to the conveyor 5, are deflected downwardly along the inclined reach of the conveyor 3 and are received by a conveyor 6 which carries them to a suitable stacking point. The conveyor 3 is formed of spaced belts 7 which pass around rolls 8 positioned adjacent the shearing mechanism, rolls 9 positioned adjacent the gate 4, and rolls 10 which are positioned below the gate and adjacent the one end of the conveyor 6. The rolls 9 and 10 are idler rolls and each pair may be mounted separately on supports 11 carried by a frame (not shown). The rolls 8 are driven so as to drive the belts in the manner indicated. As is illustrated in Figures 2 and 3, the rolls 10 are positioned beyond the rolls 9 and below the rolls 8 and 9 so as to provide a horizontal upper reach 12 along which all of the sheets pass and an inclined reach 13 along which only the defective sheets, which are deflected from their normal course by the gate 4, pass to the defective-material conveyor 6.

The conveyor 5 is likewise formed of spaced belts 14, which, at one end, pass around idle rollers 15, which are mounted on supporting brackets 16 carried by a suitable frame (not shown). The belts 14 are driven by suitable mechanism (not shown). The conveyor 6 which is positioned below the conveyor 5 is similar to the conveyor 5 and is also driven to convey the defective sheets away from the lower end of the main conveyor 3.

The gate 4 is formed of pieces of sheet metal which are welded or otherwise secured together to form a box-like structure which is generally triangular in cross-section. This gate is positioned slightly below the normal path of travel of the sheets and is supported on a shaft 17, which is mounted for rotation in bearings 18 carried by the frame 19. The top 20 of the gate is flat and when the gate is in a non-deflecting or inoperative position it is substantially parallel to the path of travel of the material. The front portion of the lower face 21 of the gate extends at an angle to the path of travel of the material and the top and bottom faces come together to a point just below the normal path of travel of the material. By this arrangement only a relatively small rotation of the gate on the shaft 17 will cause the forward end of the gate to be raised to a position to deflect the sheets downwardly from their normal path. As illustrated in Figure 3, the sheets to be deflected strike the inclined bottom face 21 of the gate when it is in elevated position and the sheets are thereby deflected downwardly along the inclined reach 13 of the conveyor.

The gate is moved from a non-deflecting position to a material-deflecting position by rotation of the shaft 17 on which it is mounted. The shaft is rotated by means of a solenoid 25. The plunger 26 of the solenoid is connected by a link 27 to a crank-arm 28, one end of which is keyed to the shaft 17. The link 27 extends downwardly beyond the point where it is connected to the crank-arm 28 and is connected to a rod 29, the lower end of which extends into the guide 30 carried by the frame in any suitable manner. The bottom end of the rod 29 carries a head 29a against which one end of a spring 31 rests. The other end of the spring 31 abuts the upper end of the guide 30. The spring 31 is placed under compression when the link 27 is raised and, consequently, when the solenoid 25 is de-energized, the spring returns the gate to normal position. A weight 32 mounted on an arm 33, which is keyed to the shaft 17 on which the gate is mounted, counteracts the weight of the gate so that the solenoid can operate the gate with the application of only a small amount of energy. The spring 31 must be of sufficient strength to overcome the effect of the weight 32.

The solenoid 25 is of the usual type and may be actuated, e. g., by automatic gauging mechanism, for determining whether or not the sheets are off-gauge. If the gauging mechanism indicates that a particular sheet is off-gauge, the solenoid is energized at the proper time and the gate moved to a material-deflecting position.

Roll 34 is positioned between the rear end of the gate 4 and the forward end of the conveyor 5 and is mounted in suitable bearings 35 carried by the frame 19. This roll is for the purpose of bridging the space between the conveyors 3 and 5. This roll is preferably driven, although it may be merely an idler roll.

The sheets pass along the conveyor 3 at a relatively high rate of speed and, as a consequence, when the gate 4 is moved to a deflecting position and the leading edge of a sheet strikes the inclined surface 21 of the gate, the sheet is quickly rotated in a clockwise direction. In order to prevent the sheet from being rotated to such an extent that it will strike the forward end of the gate, a plate 36 is positioned above the conveyor 3. This plate is supported at an angle to the horizontal substantially the same as that of the reach 13 of the conveyor 3 so that the sheet is directed to approximately the angle of this reach of the conveyor and will pass downwardly therealong. The plate 36 extends transversely out of the conveyor 3 and is supported on a crossbar 37 which is mounted on frames 38 at either side of the conveyor.

As stated above, the gate is hollow and provides a chamber for receiving air or some other fluid under pressure. Air, of course, is preferably used. The air is fed to the gate by the pipe 39 which is connected to a suitable source. The top 20 of the gate is provided with a plurality of small spaced openings 40 which are positioned along the forward end thereon. The air which is fed to the gate is discharged through these openings 40 against the bottom surface of a sheet passing over the gate. The air passes through the openings 40 under sufficient pressure to cushion the sheets and prevent them from causing excessive wear on the gate and from being defaced by the gate. It is not necessary to supply air in sufficient quantity through these openings to completely support the sheet as it passes over the gate. It is merely necessary to supply sufficient air to partially support the sheet.

As is apparent from what has been stated above, the sheets pass along the conveyor 3 and, when the gate is in inoperative or non-deflecting position, continue over the gate and onto the conveyor 5 which carries them to stacking mechanism. As the sheets pass over the gate, air is blown against the lower face thereof and they are cushioned against excessive contact with the gate. If a defective sheet is detected, the solenoid is energized and the gate is raised to material-deflecting position and the defective sheet caused to pass downwardly along the inclined reach of the conveyor and is delivered to the conveyor 6 which carries it to a stacking point.

While I have shown and described a preferred embodiment of my invention, it will be understood that my invention may be otherwise embodied within the scope of the appended claims.

I claim:

1. Apparatus for handling and separating sheet-like material comprising conveying mechanism for supporting and conveying the sheet-like material, said conveying mechanism having a movable portion for carrying the sheet-like material without relative movement between the material and the movable portion, a gate, means for supporting the gate adjacent the normal path of travel of the sheet-like material on said conveying mechanism and in a position normally to be traversed by said sheet-like material, means for moving the gate into the path of travel of said material to deflect it from its normal path, and means for blowing a fluid against that face of the sheet-like material which is opposed to the gate to partially control the movement of said material as it is carried past the gate by the conveying mechanism when the gate is in non-deflecting position.

2. Apparatus for handling and separating sheet-like material comprising conveying mechanism for supporting and conveying the sheet-like material, said conveying mechanism having a movable portion for carrying the sheet-like material without relative movement between the material and the movable portion, a gate, means for supporting the gate below the normal path of travel of the material on the conveying mechanism and in a position normally to be traversed by said sheet-like material, means for moving the gate into the path of travel of the sheet-like material for deflecting the material from its normal path of travel, and means for blowing a gas against that face of the sheet-like material which is opposed to the gate as it passes over the gate, when the gate is in a non-deflecting position, to at least partially support the material.

3. Apparatus for handling and separating sheet-like material comprising conveying mechanism for supporting and conveying the sheet-like material, said conveying mechanism having a movable portion for carrying the sheet-like material without relative movement between the material and the movable portion, a gate, means for supporting the gate below the normal path of travel of the material on the conveying mechanism and in a position normally to be traversed by said sheet-like material, means for moving the gate into and out of the path of travel of the material for deflecting the material from its normal path, when desired, and means disposed in a position to be traversed by said sheet-like material while the same is traversing the gate for blowing a gas against the lower face of the sheet-like material when the gate is in non-deflecting position to partially support the material and prevent defacement thereof by contact with the gate.

4. Apparatus for handling and separating sheet-like material comprising conveying mechanism for supporting and conveying the sheet-like material, said conveying mechanism having a movable portion for carrying the sheet-like material without relative movement between the material and the movable portion, a movable gate, means for supporting the gate below the normal path of material on the conveying mechanism, means for moving the gate into the path of travel of the material for deflecting it from its normal path of travel, said gate having a chamber therein and a plurality of openings in the face thereof adjacent the path of travel of the sheet-like material and communicating with said chamber, and means for supplying gas under pressure to said chamber, whereby gas is blown against the lower face of the sheet-like material as it passes over the gate to at least partially support the material.

5. Apparatus for handling and separating sheet-like material comprising a conveyor for supporting and conveying the sheet-like material without relative movement between the conveyor and said material, a gate for receiving material from one end of said conveyor, a second conveyor adjacent the gate to receive material passing over the gate, and means movable with the gate for blowing a gas against the bottom surface of the sheet-like material as it passes over the gate from the first-mentioned conveyor to the second conveyor.

6. Apparatus for handling and separating sheet-like material comprising a conveyor for supporting and conveying the material without relative movement between the conveyor and said material, a movable gate positioned at the discharge end of the conveyor and adapted to receive material therefrom, a second conveyor adjacent the gate adapted to receive material passing thereover, means for moving the gate into the path of travel of the sheet-like material for deflecting the material from its normal path of travel, and a guard positioned in front of and above the gate to engage the trailing edge of a deflected sheet for preventing excessive deflection of the material when intercepted by the gate.

7. In apparatus for handling and separating sheet-like material, including a conveyor, a gate movably mounted below the path of movement of said sheet-like material on the conveyor and means for moving the gate into and out of the path of said material, said gate comprising a plurality of walls forming a hollow chamber, one of said walls having an opening therein communicating with said chamber, and means for supplying a fluid under pressure to said chamber, whereby fluid under pressure is discharged from said opening against material passing thereover.

8. Apparatus for handling and separating sheet-like material comprising conveying mechanism for supporting and conveying the sheet-like material, said conveying mechanism having a movable portion for conveying the sheet-like material without relative movement between the material and the movable portion, a gate, means for supporting the gate adjacent the normal path of travel of the sheet-like material on said conveying mechanism, means for moving the gate into the normal path of travel of the sheet-like material to deflect it from its normal path, said gate having a face across which the sheet-like material moves and which tends to deface the sheet-like material by contact therewith, a plurality of fluid-discharge openings in the gate face directed toward the sheet-like material passing across the face, and means for supplying fluid under pressure to the openings whereby fluid is blown against the face of the sheet-like material adjacent the gate as it moves across the gate face to urge the sheet-like material away from the gate face to reduce defacement of the sheet-like material by contact with the gate face.

9. Apparatus for handling and separating sheet-like material comprising conveying mechanism for supporting and conveying the sheet-like material, said conveying mechanism having a movable portion for carrying the sheet-like material without relative movement between the material and the movable portion, a movable gate, means for supporting the gate below the normal path of material on the conveying mechanism, means for moving the gate into the path of travel of the material for deflecting it from its normal path of travel, said gate having a face thereof below and adjacent the normal path of travel of the sheet-like material and having a plurality of fluid-discharge openings in said face, and means for supplying fluid under pressure to the gate openings, whereby fluid is blown against the lower face of the sheet-like material as it passes over the gate to at least partially support the material.

10. Apparatus for handling and separating sheet-like material comprising a conveyor for supporting and conveying the sheet-like material without relative movement between the conveyor and said material, a gate for receiving material from one end of said conveyor, a second conveyor adjacent the gate to receive material passing over the gate, a gas passage in the gate terminating in an outlet orifice directed toward the material as it passes over the gate, and means for supplying gas under pressure to the passage so as to blow gas against the bottom surface of the sheet-like material as it passes over the gate from the first-mentioned conveyor to the second conveyor.

WILLIAM ARTHUR WARD.

REFERENCES CITED

The following references are of record in the file of this patent:

UNITED STATES PATENTS

| Number | Name | Date |
|---|---|---|
| 2,176,307 | Lamb et al. | Oct. 17, 1939 |
| 1,812,201 | Denner et al. | June 30, 1931 |
| 1,957,260 | Gayler | May 1, 1934 |
| 2,315,003 | Martin et al. | Mar. 30, 1943 |
| 1,302,466 | Finster et al. | Apr. 29, 1919 |
| 2,168,419 | Paterson | Aug. 8, 1939 |
| 629,140 | Vollkommer | July 18, 1899 |
| 1,911,397 | Saurbrey | May 30, 1933 |